US008705857B2

(12) United States Patent
Livingston et al.

(10) Patent No.: US 8,705,857 B2
(45) Date of Patent: Apr. 22, 2014

(54) SYSTEM AND METHOD OF IMAGE PROCESSING PERCEPTUAL VISIBILITY OF IMAGERY

(75) Inventors: Mark Alan Livingston, Alexandria, VA (US); Caelan Reed Garrett, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 86 days.

(21) Appl. No.: 13/572,198

(22) Filed: Aug. 10, 2012

(65) Prior Publication Data
US 2013/0039575 A1 Feb. 14, 2013

Related U.S. Application Data

(60) Provisional application No. 61/521,875, filed on Aug. 10, 2011.

(51) Int. Cl.
*G06K 9/00* (2006.01)

(52) U.S. Cl.
USPC ......................................................... 382/167

(58) Field of Classification Search
None
See application file for complete search history.

(56) References Cited

U.S. PATENT DOCUMENTS

| | | | |
|---|---|---|---|
| 6,731,790 B1 * | 5/2004 | Van de Velde et al. | 382/162 |
| 6,741,753 B1 * | 5/2004 | Moroney | 382/274 |
| 2007/0086650 A1 * | 4/2007 | Li et al. | 382/162 |
| 2008/0240557 A1 * | 10/2008 | Christie | 382/167 |
| 2010/0067791 A1 * | 3/2010 | Dai | 382/167 |
| 2010/0253852 A1 * | 10/2010 | Fukuda | 348/649 |

OTHER PUBLICATIONS

Rahman et al., "Retinex Processing for Automatic Image Enhancement", Journal of Electronic Imaging, 13(1):100-110, Jan. 2004.*
Edwin H. Land, "The Retinex Theory of Color Vision", Scientific American, 237(6):108-128, Dec. 1977.*
Hines et al., "DSP Implementation of the Retinex Image Enhancement Algorithm", In Visual Information Processing XIII, Proceeding of SPIE 5438, Spril, 2004.*
Woodell et al., "Enhancement of imagery in poor visibility conditions", Proc. SPIE 5778, Sensors, and Command, Control, Communications, and Intelligence (C3I) Technologies for Homeland Security and Homeland Defense IV, 673 (Aug. 5, 2005).*

* cited by examiner

*Primary Examiner* — Daniel Mariam
*Assistant Examiner* — Feng Niu
(74) *Attorney, Agent, or Firm* — US Naval Research Laboratory; John Leonard Young

(57) ABSTRACT

An image processing system and method corrects the perceptual quality of an image by adjusting the image colors. "Color" in this sense is to be understood as encompassing three-dimensional parameterizations of color, incorporating both intensity and hue. These measurements are made using creative computations developed and adapted from the RETINEX™ theory (Land, 1977), where the RETINEX implementation adjusts any pixel in any direction in color space and further to automatically determine the best direction for it to be adjusted to increase the perceptual visibility of the algorithm with a minimal amount of change to the original image values.

11 Claims, 10 Drawing Sheets

SYSTEM AND METHOD OF IMAGE PROCESSING PERCEPTUAL VISIBILITY OF IMAGERY

RELATED APPLICATIONS

The instant U.S. Patent Application is related to and claims the benefit of priority of U.S. Provisional Application for Patent No. 61/521,875 SYSTEM AND METHOD OF IMAGE PROCESSING PERCEPTUAL VISIBILITY OF IMAGERY, filed on Aug. 10, 2011, and having the same joint inventors, and said U.S. Provisional Application for Patent is incorporated by reference herein in its entirety. Furthermore, the instant U.S. Patent Application is related to U.S. Patent Application Ser. No. 12/416,716 METHODS AND SYSTEMS OF COMPARING FACE MODELS FOR RECOGNITION, filed on Apr. 1, 2009, and is incorporated by reference herein in its entirety.

FIELD OF THE INVENTION

The present invention is generally related to image processing. In particular the present invention is directed to correcting the perceptual quality of an image by adjusting the image colors. ("Color" in this sense is to be understood as encompassing three-dimensional parameterizations of color, incorporating both intensity and hue.)

BACKGROUND OF THE INVENTION

Existing image processing systems and methods directed toward correcting the perceptual quality of an image do not to have the flexibility to adjust pixels in multiple (independent) directions in color space. Neither preprocessed nor post processed images have an algorithm with the flexibility to correct both images that are too light and images that are too dark, even more so, images that have both problems. Many algorithms can correct one of these problems, although most existing implementations (and descriptions) only account for increasing the brightness of selected pixels in dark regions.

RETINEX™ Theory:

RETINEX Theory was proposed by Edwin Land in 1959 as a model for how the retina and cortex (thus RETINEX) logarithmically regulate the incoming flux into the eye to provide visual color constancy. Land and others have developed algorithms which implement aspects of RETINEX Theory.

Land's original algorithm was extended and implemented as a general image processing algorithm called the Multi-Scale RETINEX Algorithm by Rahman et al. which also computes the logarithmic ratio of a pixel's value and its surround.

Due to limitations in the above mentioned conventional image processing algorithms, the need exists for image processing systems and methods, directed toward correcting the perceptual quality of images, which have the flexibility to adjust pixels in multiple (independent) directions in color space.

Also, the need exists for image processing systems and methods directed toward correcting the perceptual quality of an image to incorporate either preprocessing and/or post processing algorithms having the flexibility to adjust pixels in multiple (independent) directions in color space.

Finally, the need exists for image processing systems and methods directed toward correcting the perceptual quality of an image which have the flexibility to correct images which are too light and images which are too dark, and to simultaneously correct images which exhibit both light and dark problems.

SUMMARY OF THE INVENTION

An image processing system and method corrects the perceptual quality of an image by adjusting the image colors. ("Color" in this sense is to be understood as encompassing three-dimensional parameterizations of color, incorporating both intensity and hue.) These measurements are made using novel and creative computer processing computations developed and adapted from RETINEX™ (Land, 1977), which is a theory of human color vision (i.e., intensity+hue), where the RETINEX theory is implemented to adjust any pixel in any direction in color space and further to automatically determine the best direction for it to be adjusted to increase the perceptual visibility of the image with a minimal amount of change to the original image values.

DETAILED DESCRIPTION OF THE INVENTION

Figure 1:
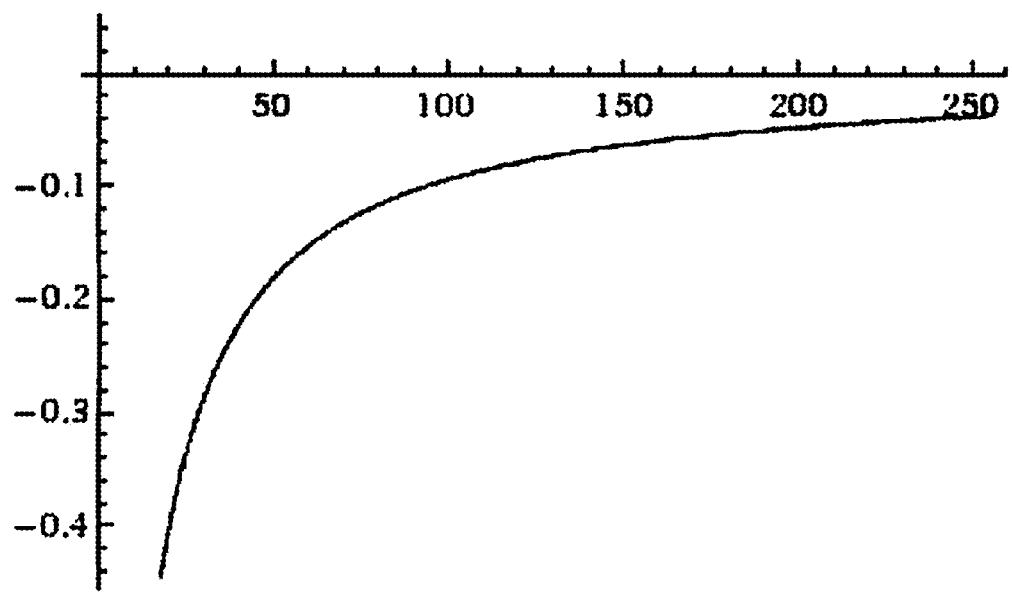
FIG. 1 illustrates a curve representing a situation in which an image is too dark and thus obscures the features in the image, such situations for which RETINEX was originally designed.

Preferred exemplary embodiments of the present invention are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that this invention can also be employed in other applications. Further, the terms "a", "an", "first", "second" and "third" etc. used herein do not denote limitations of quantity, but rather denote the presence of one or more of the referenced items(s).

According to exemplary embodiments, and referring to FIG. 1, when an image which is too dark and thus obscures the features in the image, is represented by a curve illustrated in FIG. 1, where this curve has the general shape of the dominant function, i.e., the natural logarithm, which emulates the processing of relative intensity (within color channels) of the human visual system. This is the correction function that RETINEX implementations apply, which will work well when the image is mostly dark.

Figure 2:
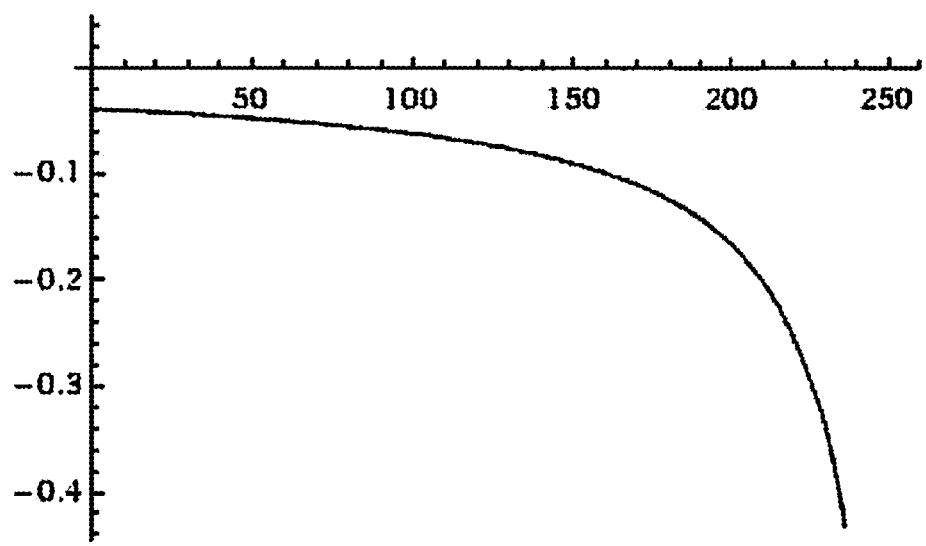
FIG. 2 illustrates a curve in the reverse situation of the illustration in FIG. 1, i.e., an image is too bright and thus obscures the features. Here the opposite correction is needed. However, the shape of the curve is the same; only the single "centering" point has been moved and the direction adjusted appropriately.

Further according to exemplary embodiments, and referring to FIG. 2, the curve illustrated in FIG. 2 represents the reverse situation of the illustration in FIG. 1; thus, in FIG. 2, an image is too bright and therefore obscures the features. Here the opposite correction is needed. However, the shape of the curve is the same; only the "centering" point has been moved and the direction adjusted appropriately.

The following formula (I) represents an example of a traditional implementation of the RETINEX algorithm (Land, 1986):

$$R^A(i, j) = \sum_k \delta \log \frac{I_{k+1}}{I_k} \qquad \overline{R}^A(i) = \frac{\sum_{j=1}^{N} R^A(i, j)}{N} \qquad (1)$$

$$\delta \log \frac{I_{k+1}}{I_k} = \begin{cases} \log \frac{I_{k+1}}{I_k}, & |\log \frac{I_{k+1}}{I_k}| > \text{threshold} \\ 0, & |\log \frac{I_{k+1}}{I_k}| > \text{threshold} \end{cases}$$

Formula (2) represents the Multi-scale RETINEX formulation (Rahman et al., 2004):

$$R_i(x, y) = a_{x,y} \sum_{k=1}^{K} W_k \ln\left(\frac{I_i(x, y)}{F_k(x, y) * I_i(x, y)}\right) \quad i = [R, G, B], \qquad (2)$$

$$N = 3 \ k = \lfloor 5, 20, 100 \rfloor, W = \left[\frac{1}{3}, \frac{1}{3}, \frac{1}{3}\right], K = 3$$

$$F_k(x, y) = \frac{1}{\sum_x \sum_y F(x, y)} \exp\left(\frac{-(x^2 + y^2)}{\sigma^2}\right) \quad a_i(x, y) = \ln\left(1 + C \frac{I_i(x, y)}{\sum_{n=1}^{N} I_n(x, y)}\right)$$

An overview of exemplary embodiments of the system follows (see FIG. 4):

The project can be written in C++ using the Fastest Fourier Transform in the West and Lib Tiff libraries. Also, any other Fourier Transform can be implemented or computing convolution directly can be implemented.

Figure 4:
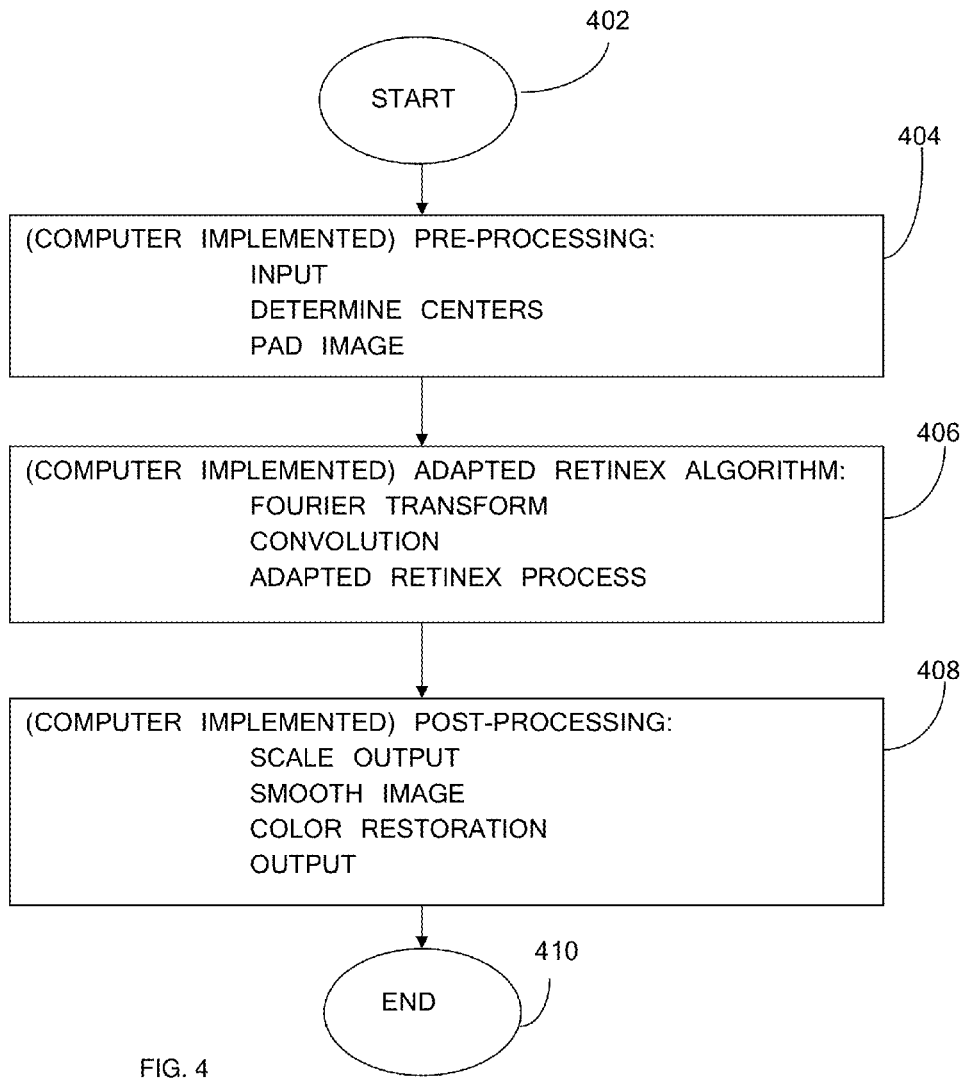
FIG. 4 illustrates the three parts of the novel adaptation of Adapted RETINEX Processing algorithm system: (1) Pre-processing; (2) Adapted RETINEX Processing algorithm; and (3) Post-processing.

Referring to FIG. 4, the system has three parts:

[1] Pre-processing 404, which includes an input, determining centers and padding images;

[2] Adapted RETINEX Processing algorithm 406, which can include Fourier Transform, Convolution, and Adapted RETINEX Processing algorithm implementation; and

[3] Post-processing 408, which includes scale output, smooth image, color restoration and output.

The initial processing, i.e., pre-processing, includes:
reading inputs as series of images i.e., video and/or static images, where the format can be MPEG, AVI, WMV, TIFFs, JPGs PNGs or any other image format, then
the method determines areas on the image with low contrast; and
saves and/or indexes the areas on the image as centers for later processing;
uses a Fast Fourier Transform to speed up convolution operator:
FFT: $O(w*h*\log(w*h))$
Convolution: $O(w*h*Kw*Kh)$.

Figure 3:
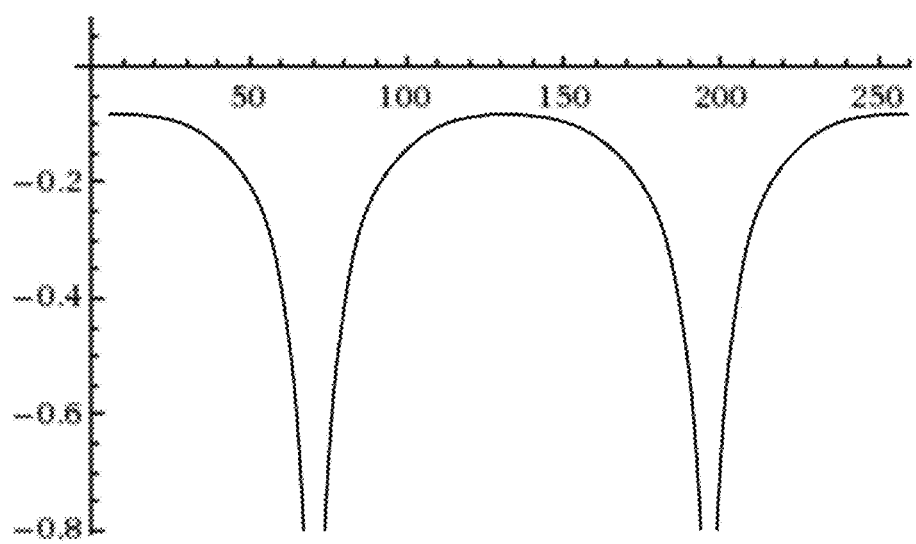
FIG. 3 illustrates a novel approach to making the correction, which is enabled by computing multiple "centering" points. Here, the curves are scaled and repeated multiple times and in both directions, as compared to the curves illustrated in FIG. 1 and FIG. 2.

The Adapted RETINEX Processing algorithm overview disclosed above, uses the same principles which provide color constancy in dark lightings and applied them to filter hazing. Selection of natural logarithm functions highlight pixel values closer to zero. And, the Adapted RETINEX Processing algorithm centers function(s) around multiple vertical asymptotes (centers) to highlight specific values. See FIG. 1 and FIG. 2 for graphs of the regular RETINEX algorithm in forward and reverse directions (i.e., correcting color values of pixels when the image is too light and when the image is too dark), and see FIG. 3 for a graphical illustration of the result of the Adapted RETINEX Processing algorithm. The Adapted RETINEX Processing algorithm is significantly different in processing than the traditional RETINEX algorithm. The traditional RETINEX algorithm highlights values closer to zero (0). In the Adapted RETINEX Processing algorithm, the process of centering in the algorithm calls for novel mathematical re-building of the algorithm and uses properties of logarithms, and thus the Adapted RETINEX Processing algorithm equation is presented in a new form, as shown in formula (3) below:

$$AR_i(x, y) = \sum_{k=1}^{K} \sum_{n=1}^{N} W_k R_n \text{sgn}(I_i(x, y) - F_k(x, y) * I_i(x, y)) \qquad (3)$$

$$\ln\left(1 + \frac{|F_k(x, y) * I_i(x, y) - I_i(x, y)|}{\sqrt[b]{D + |I_i(x, y) - C_n|}}\right)$$

The final processing:
ranges the output(s) of RETINEX,
conducts weighted averages with previous frame(s) for video processing,
smooths noisy images of the original noise reduction algorithm, which maintains edges while reducing noise highlighted by RETINEX processing; and, in the case of color imagery, restores some original color to the image, using a new color restoration coefficient formula:

$$a_i(x, y) = \frac{1}{2}\left(1 + N \frac{I_i(x, y)}{\sum_{n=1}^{N} I_n(x, y)}\right). \qquad (4)$$

(referring to formula (4)), where N is the number of channels describing the color, and where N is typically represented by the value "three" in most image storage formats.

Analysis:
A new local contrast metric involving the difference between a pixel and its background is applied to images. The mean contrast is recorded for each image before and after processing.

Essentially, the algorithm described in the exemplary embodiments uses statistical measures of the image to estimate the proper location of this centering point and/or multiple centers, then runs the Adapted RETINEX Processing algorithm implementations in both directions for the set of pixels which are deemed to require adjustment in order to be properly perceived by the human who will view these images. In other words, determining forward and reverse directions refers to correcting color values of pixels (where color is considered in terms of hue and/or intensity) by determining a logarithmic ratio for the amount of correction desired. Associated with determining forward and reverse direction is determining a weighted scaling and a direction for scaling and conducting smoothing operations, converting an output color or space, restoring color and outputting a corrected image. So, when an image is dark a logarithmic ratio is determined to correct the color values of pixels; and when an image is light, another logarithmic ratio is determined which is a reverse of the logarithmic ratio determined for the dark image.

Further, computer processing related programmatic implementations of the Adapted RETINEX Processing algorithm described in the exemplary embodiments have greater flexibility and the ability to find the appropriate centering points ("center" is best conceived as a peak point or a valley point (however, "center" is preferably described as a mathematical-critical point, having min, max, deflection and including end points) in a color/intensity distribution, which may occur anywhere in the domain) and/or multiple centers running in both directions.

Additionally, the Adapted RETINEX Processing algorithm described in the exemplary embodiments runs with non-conventional, as well as traditional color spaces. The traditional RGB color space used by most computer monitors and graphics processors is not the optimal space in which to perform the computations of the exemplary embodiments (even though the algorithm may be run in that space). The television standard YIQ color space (which approximates an intensity channel and two color channels, most like human visual systems and several other color spaces) is a more suitable space in which to perform the computations of the exemplary embodiments. RETINEX implementations run in any color space equally well.

More choices of color space selection exist, as described in the exemplary embodiments, such as CIE-Luv or CIE-Lab, both of which also approximate one intensity and two color channels).

To model the effectiveness of the new Adapted RETINEX Processing algorithm, a new local contrast metric involving the difference between a pixel and its background is applied to two categories of images: Category 1: Increase in average contrast and standard deviation; and Category 2: Decrease in average contrast and standard deviation.

Exemplary embodiments also describe an edge-based image smoothing (i.e., noise removal) algorithm to assist with the image processing. The RETINEX implementation (like nearly all image processing algorithms) performs better when the amount of noise in the input image is low. The programmatic implementations described in the exemplary embodiments are based on the standard flood-fill algorithm guided by the Canny edge detection algorithm. Other edge detection algorithms, for example, based on the Sobel operator or Marr-Hildreth method would be equivalents.

This image processing image correction system disclosed herein is easily used in transportation situations to greatly improve visibility and reduce accidents due to problematic weather. The system can easily be implemented into airplane cockpits, helmet cameras, or automobile dashboards.

The Adapted RETINEX Processing algorithm is effective at improving contrast in low-visibility imagery. This new system is very effective at enhancing a wide range of video, as well as static images. Thus, the system has implications in improving visibility in a variety of dark or foggy situations and therefore improving safety.

The imagery to which the RETINEX theory is applicable is not limited to synthetic imagery, i.e., rendered images. The images can be photographic images, as well as other types of images, including digital images.

TABLE 1

| Mean Local Band-limited Contrast of Target | | | | |
|---|---|---|---|---|
| Image | Original | HE | MSR | ARP |
| Landscape | 4.71 | 33.75 | 8.89 | 45.02 |
| Skyline | 1.23 | 7.94 | 5.63 | 28.43 |
| Snowy Road | 5.88 | 25.42 | 12.26 | 34.20 |
| Sandstorm | 13.69 | 23.47 | 8.34 | 47.96 |
| Underwater | 13.11 | 33.27 | 8.47 | 49.72 |
| Night Vision | 32.68 | 44.46 | 17.46 | 58.34 |
| Playground | 35.94 | 38.28 | 23.18 | 63.48 |

Figure 5:
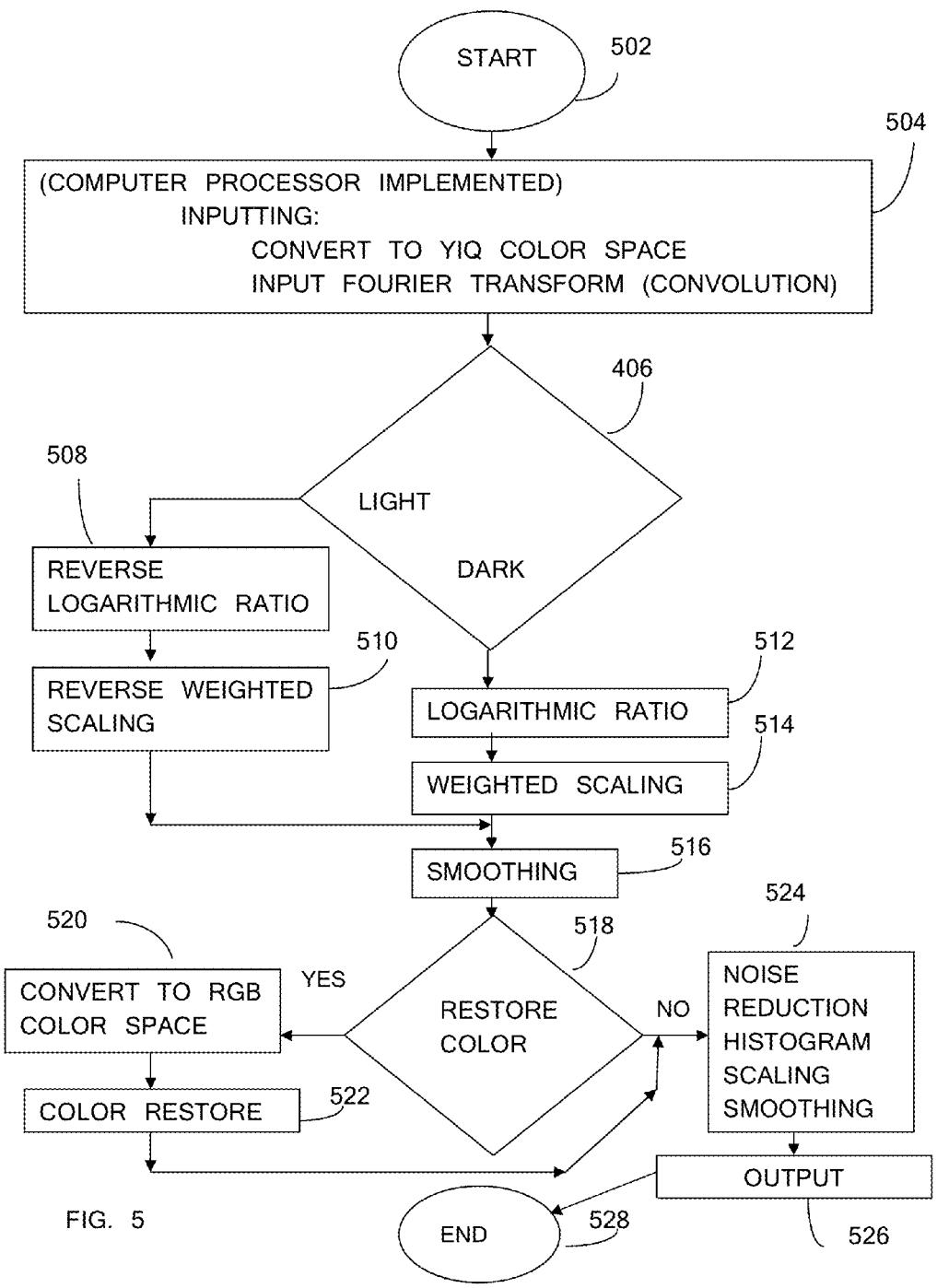
FIG. 5 illustrates an overview of the Adapted RETINEX Processing algorithm written in C++ using the Fastest Fourier Transform in the West and Lib TIFF libraries.
Figure 6:
FIG. 6 illustrates an original exemplary unprocessed image.
Figure 7:
FIG. 7 illustrates an image with histogram equalization processing.
Figure 8:
FIG. 8 illustrates Multi-scale RETINEX processing.
Figure 9:
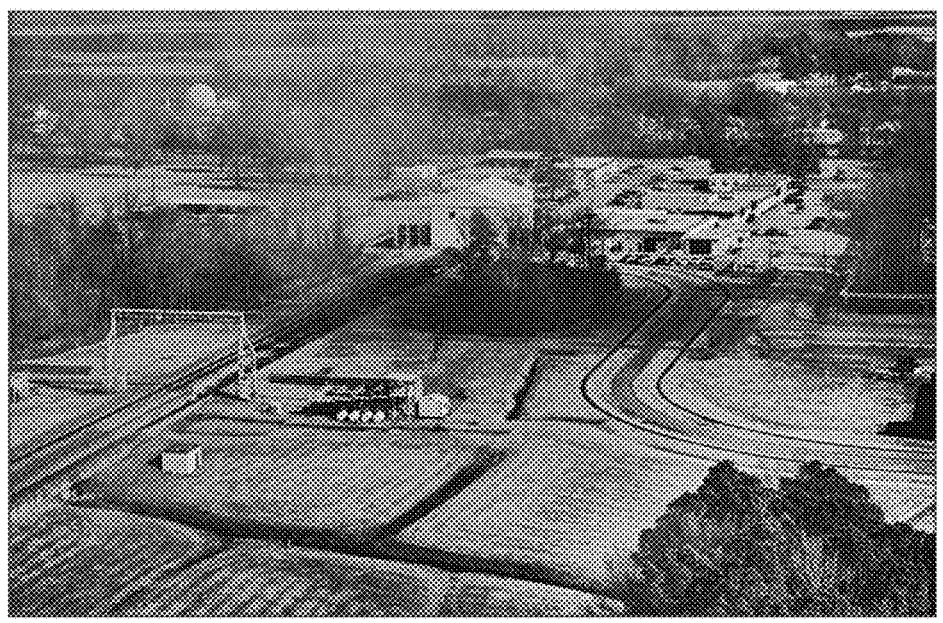
FIG. 9 illustrates Adapted RETINEX Processing.

Table 1 discloses a numerical comparison of the new Adapted RETINEX Processing algorithm to other image processing approaches, where the numbers in the ARP column have values many times greater than numerical values in other characterizations; thus the contrast values obtainable by the ARP implementation far exceed any contrast values obtained in the other characterizations. In Table 1, "Original" characterizes a metric computed on an original image; "HE" is a metric computed on an image processed by histogram equalization; "MSR" is a metric computed on an image processed by the Multi-scale RETINEX algorithm of Rahman et al., and "ARP" is a metric on an image processed by the new Adapted RETINEX Processing algorithm. FIG. 6 illustrates an original unprocessed or minimally processed image. FIG. 7 illustrates an image with histogram equalization processing. FIG. 8 illustrates Multi-scale RETINEX processing; and FIG. 9 illustrates the Adapted RETINEX Processing algorithm. Referring to FIG. 4 and FIG. 5, at an operation Start 402, an image processing method is implemented in a computer readable and executable program on a computer processor, correcting perceptual quality of an image by adjusting parameterizations of color intensity and hue of the image, using an Adapted RETINEX Processing (ARP) algorithm. The method comprises correcting, by the computer processor, perceptual quality of the image by adjusting pixels in multiple independent directions in color space by performing various computer implemented operations (see FIG. 4 and FIG. 5) to correct perceptual quality of the image by correcting images which are too light and correcting images which are too dark, simultaneously; by further performing pre-processing 404 operations and performing post-processing 408 operations by the computer processor to correct perceptual quality of the image, where further operations performed by the computer processor include operations of: using statistical algorithms (see FIG. 4, element 406) to estimate proper location of a centering point of the image, where the centering point is a "mathematically-critical" point (i.e., having a min, max, deflection and/or ends) in a color-intensity distribution in multiple independent directions in color space. The operations also include estimating proper location of a set of multiple centers, and executing by the computer processor the ARP algorithm in both directions for a set of pixels needing adjustment to be perceived. Essentially, the system runs the Adapted RETINEX Processing algorithm in both directions for the set of pixels which are deemed to require adjustment in order to be properly perceived by the human who will view these images. Thus, determining forward and reverse directions refers to correcting color values of pixels (where color is considered in terms of hue and/or intensity) by determining a logarithmic ratio for the amount of correction desired. Associated with determining forward and reverse directions is determining a weighted scaling and a direction for scaling and conducting smoothing operations, converting an output color or space, restoring color and outputting a corrected image. So, when an image is dark a logarithmic ratio is determined to correct the color values of pixels; and when an image is light, another logarithmic ratio is determined which is reverse of the logarithmic ratio determined for the dark image.

The method further includes executing the ARP algorithm using an internal color space approximating human perceptual experience of color.

The pre-processing 404 operations include inputting image data, determining a set of one or more centers, and padding images, where the set of one or more centers is placed to increase contrast and maintain esthetic quality in images.

Again referring to FIG. 4, the Adapted RETINEX Processing algorithm 406 further includes performing operations from a group of operations consisting of executing either Fourier Transforms, or directly executing convolution operations, or executing wavelet transforms, or executing integration operations, or executing averaging operations, performed at each pixel to measure a context of each pixel.

The method includes performing post-processing 408 operations which scale outputs, smooth images, provide color restoration and outputting images, where smoothing removes noise, based on a standard flood-fill algorithm and an edge detection algorithm. Any edge detection algorithm can be used, such as CANNY, SOBEL, MARR-HILDRETH, and any other edge detection algorithm.

Figure 10:
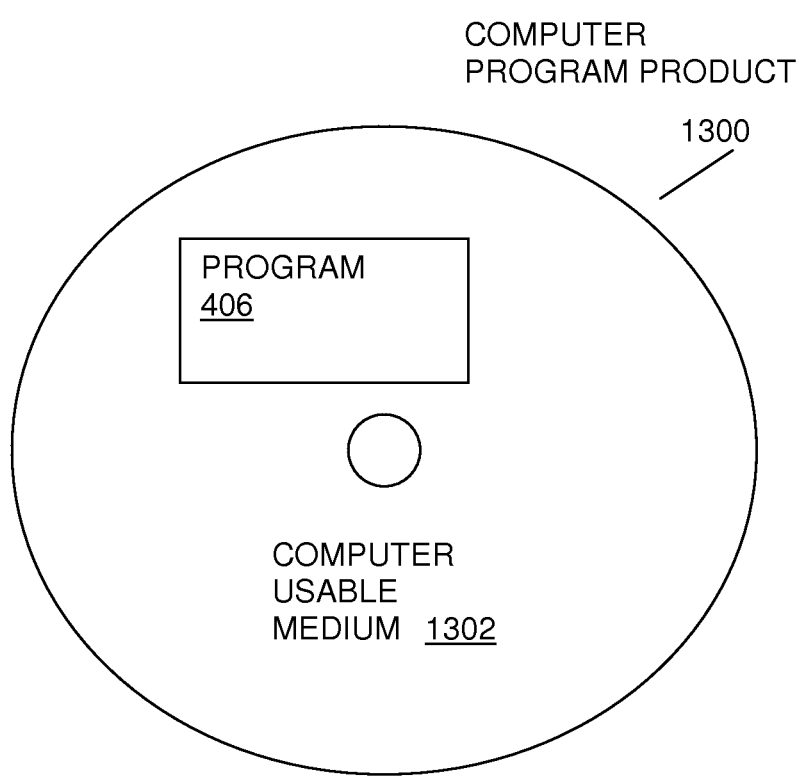
FIG. 10 illustrates an exemplary computer readable and computer executable medium containing a program product including the Adapted RETINEX Processing algorithm in the form of program logic described as a method 406.

Referring to FIG. 4, FIG. 5, and FIG. 10, an image processing method and system, are disclosed which include a computer readable and executable program on a computer processor, determining correcting perceptual quality of an image by adjusting parameterizations of color intensity and hue of the image, using an Adapted RETINEX Processing (ARP) algorithm.

The system includes at least, a computer processor having a display, an input device and an output device, a network interface communicatively coupling the computer processor to a network; and a memory having a dynamic repository, an algorithm unit and a program unit containing a computer readable and computer executable program code 406.

In addition, the system includes a memory controller communicatively coupling the computer processor with contents of the dynamic repository, the algorithm unit and the computer readable and computer executable program 406 residing in the program unit and/or memory, and when executed by the computer processor, the computer readable and computer executable program 406 causes the computer processor to perform the operations of:

referring to FIG. 4, element 404 and FIG. 5, element 504, inputting image data, where image data includes any image format, including YIQ, RGB, HSV and standard color data;

again referring to FIG. 4, element 404, 406 and FIG. 5, element 504, computing Fourier Transform of an image and computing convolution of the image in order to compute a blur of the image, where computing the blur of the image, using the ARP algorithm includes performing operations from a group of operations consisting of either executing Fourier Transforms, and/or executing convolution operations, and/or executing wavelet transforms, and/or executing integration operations, and/or executing averaging operations, performed at each pixel to measure a context of each pixel;

referring to FIG. 5, element 406, where element 406 is the Adapted RETINEX Processing algorithm and/or program element containing at least the algorithmic expression for indexing the areas on the image as centers, as characterized by formula (3) as follows:

$$AR_i(x, y) = \sum_{k=1}^{K} \sum_{n=1}^{N} W_k R_n \text{sgn}(I_i(x, y) - F_k(x, y) * I_i(x, y)) \ln\left(1 + \frac{|F_k(x, y) * I_i(x, y) - I_i(x, y)|}{\sqrt[b]{D + |I_i(x, y) - C_n|}}\right), \quad (3)$$

where $C_n$ represents a set of one or more centers.

determining simultaneously, by the computer processor, when the image is light, and when the image is dark; and simultaneously correcting, by the computer processor, when the image is light and when the image is dark, where correcting includes sub-operations of:

referring to FIG. 5, when the image is light, determining a reverse logarithmic ratio 508, determining a reverse weighted scaling 510, conducting smoothing 516 operations, converting an output color or space 520, restoring color 522 and outputting 526 a corrected image 524, and again referring to FIG. 5, when the image is dark, determining a logarithmic ratio 512, determining a weighted scaling 514, conducting smoothing operations 516, determining if color restoration is applicable 518, and when color restoration is applicable, determining color parameters 520, and determining noise reduction, histogram scaling, image smoothing 524, and outputting 526 the corrected image.

FIG. 10 illustrates an exemplary computer readable and computer executable medium (computer usable medium 1302) containing a computer program product 1300 including the Adapted RETINEX Processing algorithm and/or program logic of a method 406 executed on an image processing system determining and correcting perceptual quality of an image by adjusting parameterizations of color intensity and hue of an image.

In conclusion, reverse RETINEX as disclosed herein, is more effective at enhancing lighter images than standard RETINEX. Further, the Adapted RETINEX Processing algorithm, as disclosed herein, is more effective at enhancing images with multiple areas too dark and/or multiple areas too light, as compared to standard RETINEX or Multi-scale RETINEX (see FIG. 3 for an exemplary illustration of the results of determining multiple centering points and completing both light and dark corrections at once). The ARP algorithm can e effectively be used in night vision applications, as well as commercial and/or transportations applications.

While the exemplary embodiments have been particularly shown and described with reference to preferred embodiments thereof, it will be understood by those skilled in the art that the preferred embodiments including any first, second and/or third exemplary embodiments have been presented by way of example only, and not limitation; furthermore, various changes in form and details can be made therein without departing from the spirit and scope of the disclosed invention.

Thus, the breadth and scope of the present exemplary embodiments should not be limited by any one or more of the above described preferred exemplary embodiment(s), but should be defined only in accordance with the following claims and their equivalents. All references cited herein, including issued U.S. patent, or any other references are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The foregoing description of the specific embodiments will so fully reveal the general nature of the invention that others can, by applying knowledge within the art, readily modify and/or adapt for various applications such specific embodiments, without undue experimentation, without departing from the general concept of the present invention. Therefore, such adaptations and modifications are intended to be within the meaning and range of equivalents of the disclosed embodiments claimed herein and below, based on the teaching and guidance presented herein and the claims which follow:

What is claimed is:

1. An image processing method, implemented in a computer readable and executable program on a computer processor, correcting perceptual quality of an image by adjusting parameterizations of color intensity and hue of the image, using an Adapted RETINEX Processing (ARP) algorithm, the method comprising:
   correcting, by the computer processor, perceptual quality of the image by adjusting pixels in multiple independent directions in color space;
   performing operations by the computer processor to correct perceptual quality of the image by correcting images which are too light and correcting images which are too dark, simultaneously; and
   performing pre-processing operations and performing post-processing operations by the computer processor to correct perceptual quality of the image, wherein operations performed by the computer processor include operations of:
      using statistical algorithms by the computer processor to estimate proper location of a centering point of the image, wherein the centering point is a point in a color—intensity distribution in multiple independent directions in color space,
      estimating proper location of a set of multiple centers, and
      executing by the computer processor the ARP algorithm in both directions for a set of pixels needing adjustment to be perceived.

2. The method of claim 1, wherein the ARP algorithm is executing using an internal color space approximating human perceptual experience of color.

3. The method of claim 1, wherein performing pre-processing operations includes inputting image data, determining a set of one or more centers, and padding images, wherein the set of one or more centers is placed to increase contrast and maintain esthetic quality in images.

4. The method of claim 1, wherein executing the ARP algorithm includes performing operations from a group of operations consisting of one of executing Fourier Transforms, executing convolution operations, executing wavelet transforms, executing integration operations, and executing averaging operations, performed at each pixel to measure a context of each pixel.

5. The method of claim 1, wherein performing post-processing operations includes scaling outputs, smoothing images color restoration and outputting images, wherein smoothing removes noise, based on a standard flood-fill algorithm and an edge detection algorithm, and wherein the edge detection algorithm includes CANNY, SOBEL, MARR-HILDRETH, and any other edge detection algorithm.

6. An image processing system, including a computer readable and executable program on a computer processor, determining and correcting perceptual quality of an image by adjusting parameterizations of color intensity and hue of the image, using an Adapted RETINEX Processing (ARP) algorithm, the system comprising:
   a computer processor having a display, an input device and an output device;
   a memory having a dynamic repository, an algorithm unit and a program unit containing a computer readable and computer executable program; and
   a memory controller communicatively coupling the computer processor with contents of the dynamic repository, the algorithm unit and the computer readable and computer executable program residing in the program unit, wherein when executed by the computer processor, the computer readable and computer executable program causes the computer processor to perform the operations of:
      inputting image data, wherein image data includes any image format, including YIQ, RGB, HSV and standard color data;
      computing an image color distribution in proximity to each pixel of a plurality of pixels;
      determining simultaneously, by the computer processor, wherein when the image is light, and wherein when the image is dark;
      indexing and saving by the computer processor critical values on the image color distribution as a set of one or more centers for later processing, wherein the set of one or more centers is placed in the image color distribution to increase contrast and maintain esthetic quality in images; and
      simultaneously correcting, by the computer processor, when the image is light and when the image is dark, wherein correcting includes sub-operations of:
         when the image is light, determining a reverse logarithmic ratio, determining a reverse weighted scaling, conducting smoothing operations, converting an output color or space, restoring color and outputting a corrected image, and
         when the image is dark, determining a logarithmic ratio, determining a weighted scaling, conducting smoothing operations, determining if color restoration is applicable, and
         when color restoration is applicable, determining color parameters, and determining noise reduction, histogram scaling, image smoothing, and outputting the corrected image.

7. The system of claim 6, wherein computing the image color distribution in proximity to each pixel of the plurality of pixels, using the ARP algorithm includes performing operations from a group of operations consisting of one of executing Fourier Transforms, executing convolution operations, executing wavelet transforms, executing integration operations, and executing averaging operations, performed at each pixel to measure a context of each pixel.

8. The system of claim 6, wherein determining when the image is light, and when the image is dark, and wherein indexing by the computer processor critical values on the image color distribution as a set of one or more centers are characterized by the ARP algorithmic expression:

$$AR_i(x, y) = \sum_{k=1}^{K} \sum_{n=1}^{N} W_k R_n \mathrm{sgn}(I_i(x, y) - F_k(x, y) * I_i(x, y)) \ln\left(1 + \frac{|F_k(x, y) * I_i(x, y) - I_i(x, y)|}{\sqrt[b]{D + |I_i(x, y) - C_n|}}\right),$$

where $C_n$ represents centers.

9. A non-transitory computer readable medium having a plurality of computer executable instructions executed by a computer processor causing the computer processor to perform a method of determining and correcting perceptual quality of an image by adjusting parameterizations of color intensity and hue of the image, using an Adapted RETINEX Processing (ARP) algorithm, the plurality of computer executable instructions including:
  instructions causing the computer processor to perform operations of inputting image data, wherein image data includes any image format, including YIQ, RGB, HSV and standard color data;
  instructions causing operations of computing an image color distribution, in proximity to each pixel of a plurality of pixels;
  instructions causing operations of determining simultaneously, by the computer processor, wherein when the image is light, and wherein when the image is dark;
  instructions causing operations of indexing and saving by the computer processor critical values on the image color distribution as a set of one or more centers for later processing, wherein the set of one or more centers is placed in the image color distribution to increase contrast and maintain esthetic quality in images; and
  simultaneously correcting, by instructions causing the computer processor, when the image is light and when the image is dark, to perform correcting includes sub-operations of:
  when the image is light, determining a reverse logarithmic ratio, determining a reverse weighted scaling, conducting smoothing operations, converting an output color or space, restoring color and outputting a corrected image, and
  when the image is dark, determining a logarithmic ratio, determining a weighted scaling, conducting smoothing operations, determining if color restoration is applicable, and
  when color restoration is applicable, determining color parameters, and determining noise reduction, histogram scaling, image smoothing, and outputting the corrected image.

10. The non-transitory computer readable medium of claim 9 having a plurality of computer executable instructions causing the computer processor to perform operations of, computing the image color distribution in proximity to each pixel of the plurality of pixels, using the ARP algorithm further includes performing operations from a group of operations consisting of one of executing Fourier Transforms, executing convolution operations, executing wavelet transforms, executing integration operations, and executing averaging operations, performed at each pixel to measure a context of each pixel.

11. The non-transitory computer readable medium of claim 9 having a plurality of computer executable instructions causing the computer processor to perform operations of determining when the image is light, and when the image is dark and of indexing by the computer processor critical values on the image color distribution as a set of one or more centers are characterized by the ARP algorithmic expression:

$$AR_i(x, y) = \sum_{k=1}^{K} \sum_{n=1}^{N} W_k R_n \mathrm{sgn}(I_i(x, y) - F_k(x, y) * I_i(x, y)) \ln\left(1 + \frac{|F_k(x, y) * I_i(x, y) - I_i(x, y)|}{\sqrt[b]{D + |I_i(x, y) - C_n|}}\right),$$

where Cn represents centers.

* * * * *